United States Patent [19]
Nolley, Jr.

[11] 3,814,262
[45] June 4, 1974

[54] EMULSION SEPARATION APPARATUS

[75] Inventor: John Paul Nolley, Jr., Arlington Heights, Ill.

[73] Assignee: Universal Oil Products Company, Des Plaines, Ill.

[22] Filed: Oct. 12, 1972

[21] Appl. No.: 297,171

[52] U.S. Cl............................. 210/519, 210/DIG. 5
[51] Int. Cl............................................. B01d 21/24
[58] Field of Search ........... 210/519, 520, 521, 522, 210/532, 541, 172, 73, 83, 84, DIG. 5; 55/170

[56] References Cited
UNITED STATES PATENTS

| | | | |
|---|---|---|---|
| 634,272 | 10/1899 | Pye ................................. | 210/532 X |
| 2,263,167 | 11/1941 | Dorr et al. .......................... | 210/520 |
| 2,355,305 | 8/1944 | Koenig................................ | 210/519 |
| 2,497,392 | 2/1950 | Breultel ............................. | 210/521 |
| 2,531,547 | 1/1950 | Ayres................................. | 210/519 X |
| 2,602,465 | 7/1952 | Coehring ............................ | 210/519 |
| 3,240,339 | 3/1966 | Lane ................................. | 210/532 X |

Primary Examiner—Theodore A. Granger
Attorney, Agent, or Firm—James R. Hoatson, Jr.; Robert W. Erickson; Page, II: William H.

[57] ABSTRACT

An emulsion separation apparatus which includes preferably a horizontally positioned vessel which contains concentric tubes which contain openings located preferably 180° apart to allow an emulsion to pass into the vessel through the inner tube of the series of tubes, through the opening in the inner tube into an annular volume between said tubes and out of the openings of an outer tube of the series of tubes. The volume within the settling vessel is a sufficient quantity to allow emulsion to there after be separated into two separate liquid phases relatively free of each other. This apparatus is applicable to the petrochemical arts and is especially useful for the separation of two phase emulsions into separate phases being relatively free of the other components of the emulsion.

9 Claims, 2 Drawing Figures

PATENTED JUN 4 1974 3,814,262

3,814,262

EMULSION SEPARATION APPARATUS

BACKGROUND OF THE INVENTION

1. Field of the Invention

The field of art to which this invention pertains is hydrocarbon separation. In particular the field of art to which this invention pertains is emulsion separation apparatus.

2. Description of the Prior Art

Much prior arts exist in the liquid extraction processes in which emulsions are to be separated into separate relatively pure liquid phases. In particular many descriptions of prior art separation or settling devices can be found in a book by R. E. Treybal, entitled *Liquid Extraction*, McGraw Hill, 1951. In this book there are described many settling type devices which can be used to separate emulsion by settling into two relatively purified liquid streams.

BRIEF SUMMARY OF THE INVENTION

My invention can be basically summarized as an emulsion separating apparatus which comprises a relatively elongated settling vessel which has a horizontal emulsion conduit located within said vessel. The emulsion conduit comprises two concentric tubes having longitudinally place slots on the tubes and blocked off at one end. The other end of the inner tube is connected to an emulsion inlet means while the other end of the outer tube is blocked off from the inside of the vessel. Located on the settling vessel are upper and lower liquid output streams which can remove purified liquid phases. The apparatus functions to allow the emulsion to be passed into the inner tube of the emulsion conduit wherein the emulsion passes through the openings located on the inner tube into an annular space between the inner and outer tubes, through the openings in the outer tubes and into the interior of the vessel. Eventually the materials are separated into two essentially purified liquid phases.

A broad embodiment of my invention resides in a settler apparatus for separating an emulsion into two liquid phases which apparatus comprises: (a) a settling vessel; (b) a horizontal emulsion conduit located within said vessel, said emulsion conduit comprising horizontally disposed inner and outer tubes axially aligned to form an annular volume between the inner and outer tubes, said inner tube having openings longitudinally arranged on said tube, said outer tube having openings longitudinally arranged on said tube; (c) upper and lower liquid outlet means connected to said vessel to allow the removal of liquid from a top and bottom portion of said vessel; and (d) emulsion inlet means connected to said inner tube to allow passage of emulsion into said inner tube; whereby emulsion can pass into said inner tube, through the openings located thereon into said annular volume, through the openings located in said outer tube into said vessel to be separated into two phases and removed from said vessel by said upper and lower outlet means.

Figure 1:
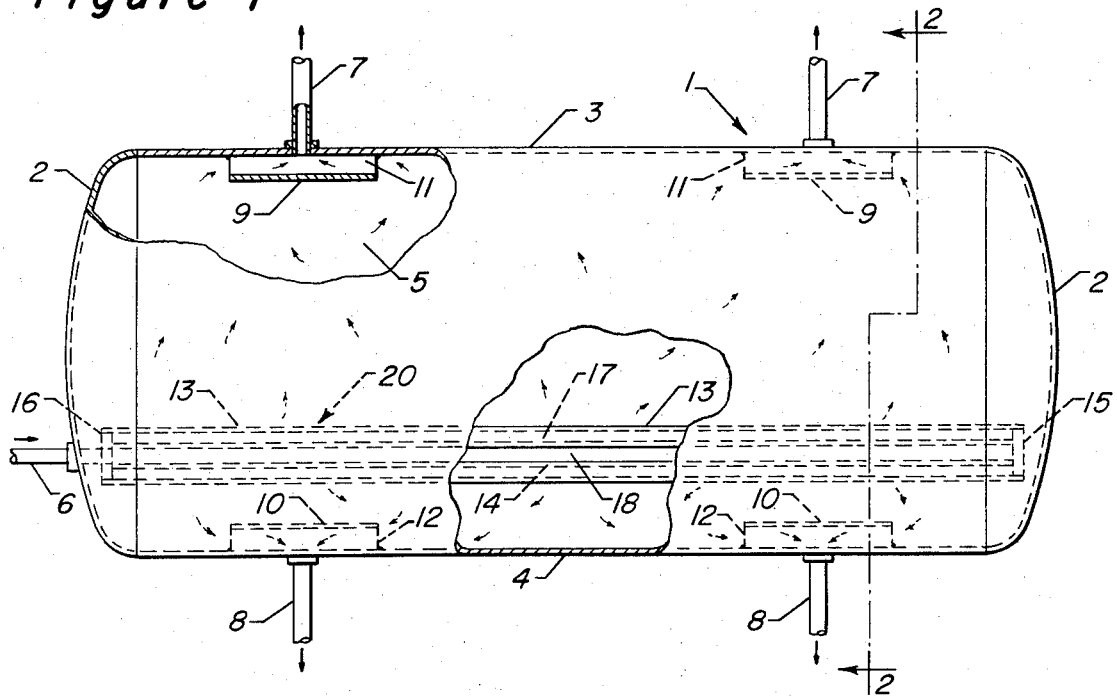
FIG. 1 shows an overall side view of a preferred embodiment of the apparatus of my invention.

The settling vessel 1 is shown as a relatively elongated cylindrical vessel placed so that its longitudinal axis lies in a horizontal direction. Located at either end of the settling vessel are caps 2 which are securely attached to the cylinder to form an enclosed vessel.

The upper portion 3 and bottom portion 4 of the settling vessel are shown as the upper wall and lower wall of the cylinder respectively. Located at an upper portion of vessel 1 are upper liquid outlet means 7 which pass through the upper wall of vessel 1. Preferably located within the vessel volume 5 are the upper liquid outlet distribution means 9 which preferably are elongated tubes bisected and welded or attached to the inside of the vessel 1 so that the liquid flowing through the upper liquid outlet means can be withdrawn from more than one location on the top portion of volume 5 within the vessel. Similarly the lower liquid outlet means 8 are attached to distribution means 10 located within volume 5 of the settling vessel 1. Individual distribution outlet 11 and 12 are shown as part of distribution means 9 and 10 respectively.

It is preferred that the upper and lower outlet means be located so that there are preferably two or more outlets at the top and the bottom, so that the flow of material in the liquid phases is either in upward or downward direction with a minimum lateral flow allowed.

Located within volume 5 of settling vessel 1 is the horizontal emulsion conduit 20. The horizontal emulsion conduit comprises two concentric tubes which are positioned so that an annular volume is formed between the individual tubes. The outer tube 13 and inner tube 14 are spaced so that an annular volume 17 is formed between the outside of the inner tube 14 and the inside of the outer tube 13. Also shown in FIG. 1 is a slot 18 running longitudinally along the outer tube 13. Located at one end of both tubes is plate 15 which serves to seal off the ends of the annular space and the two tubes from the inside volume 5 of the settler vessel 1. In a similar manner plate 16 is located at the other end of the horizontal emulsion conduit to seal off the outer tube and the annular space from the inner volume 5 within vessel 1.

Emulsion inlet means 6 passes through cap 2 and into volume 5 of the settling vessel. The emulsion inlet means 6 is connected directly to the inner tube 14 to allow the passage of an emulsion into the inner tube, through an opening located on that tube, into the annular space located between the tubes, out of the outer tube through an opening located on that tube, and into a volume 5 within the settling vessel.

Figure 2:
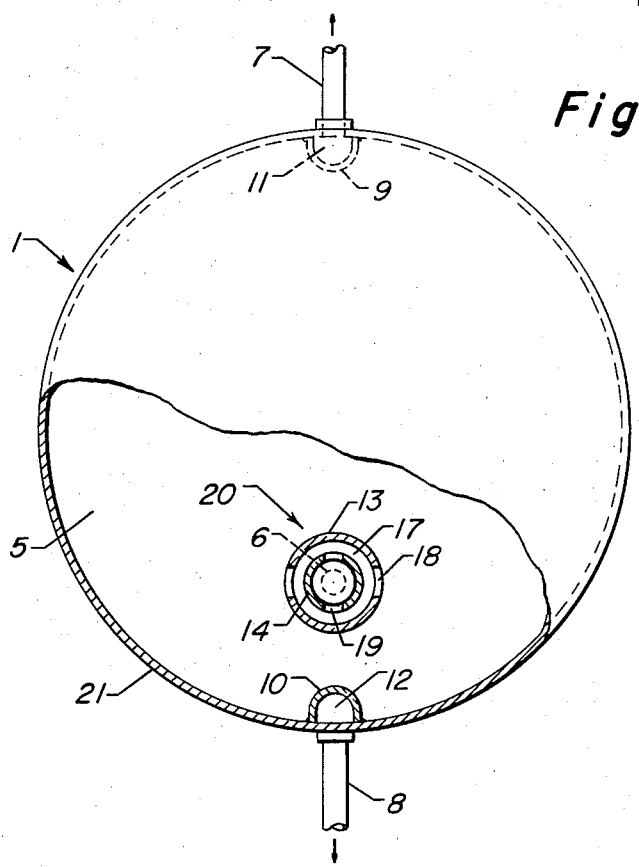
FIG. 2 shows a sectional view which vertically cuts the apparatus as shown in FIG. 1.

FIG. 2 shows a vertical sectional view of the vessel and the associated apparatus of FIG. 1. In FIG. 2 the vessel 1 is shown with its inner volume 5 located within the shell of the vessel 1. At the upper and lower portions of settling vessel 1 there are shown the upper and lower liquid outlet means 7 and 8 respectively. Upper liquid outlet means 7 passes through wall 21 and connects with the volume formed by distribution means 9 which preferably is a bisected tube connected to the inner wall 21 of the vessel 1. Shown on fluid distribution means 9 is inlet 11 which allows liquid to flow into the fluid distribution means 9 and eventually be recovered by the upper liquid outlet means 7. On the lower portion of wall 21 is lower liquid outlet means 8 which is connected to the volume contained within fluid distribution means 10 with its associated fluid inlet 12. The construction of both the upper and lower fluid distribution means and upper and lower liquid outlet means are substantially similar.

Located within volume 5 of the settling vessel 1 is shown a cross sectional view of the horizontal emulsion conduit 20. The entire conduit is made up of two tubes 13 and tube 14 which are concentrically arranged so that the outer tube 13 and the inner tube 14 form an annular volume 17 between the inside of outer tube 13 and the outside of inner tube 14. Located on the inner tube 14 are openings, and in this case, two slots 19 running lengthwise along the length of the tube. These slots preferably are vertically arranged on the top and bottom portions of inner tube 14. Preferably on outer tube 13 there are shown two horizontally opposed slots 18 which preferably are positioned at about a 90° angle with the slots or the holes on the inner tube. The openings on either or both the inner or outer tubes may be holes placed longitudinally along each tube.

The arrangement of the slots on the outer and inner tubes allows emulsion to flow from the inside portion of the inner tube, vertically upward and vertically downward out of the two slots on the inner tube, passing against the inside walls of the outer tube 13 and eventually directed in a horizontal manner through the horizontally opposed slots 18 to be passed into volume 5 wherein relatively pure liquid phases can be removed from the upper and lower liquid outlet means.

DETAILED DESCRIPTION OF THE INVENTION

The apparatus of my invention is particularly useful in processes in which an emulsion is desired to be separated into two relatively pure liquid phases. In particular my apparatus is applicable to HF or sulfuric acid alkylation although the apparatus of my invention may be utilized in many of the solvent extraction processes in which an emulsion comprising a solvent and hydrocarbon mixture is desired to be separated into two liquid phases.

In particular the apparatus of my invention is suitable for HF alkylation reactions involving either paraffinic or aromatic feedstocks to be combined with olefins. In most HF alkylation processes an emulsion of hydrogen fluoride and hydrocarbon is maintained for a period generally ranging from about a few to about 10 minutes in order to reduce the alkyl flourides in the hydrocarbon phase. In processes where contact times as long as those described above are not utilized my apparatus may still be utilized to separate an emulsion into hydrocarbon and acid phases. After the mixing of the emulsion has been completed it is desired to separate the hydroflouric acid from the liquid hydrocarbons. The most commonly used method is through the use of settlers which are generally large vessels which allow sufficient residence time within the vessel and are designed so that the vertical velocities within the vessel are such that a hydrocarbon stream containing preferably less than about one percent dissolved acid can be removed from the upper portion of the settler while an acid phase which may contain as much as 15 percent dissolved hydrocarbon may be removed from the bottom of the settling apparatus.

In order to effect the above separation the apparatus of my invention is proposed. The settling vessel of my invention is preferably an elongated cylindrical vessel which is layed on its side so that the longitudinal axis thereof rests in a horizontal position. The reason for this is that it is preferred to have a large horizontal surface area within the settling apparatus so that the vertical velocities of hydrocarbon in an upward direction are reasonably low in order to prevent excess entrainment of acid in the hydrocarbon phase removed from the upper portion of the apparatus. Preferably the cross-sectional area (measured in the horizontal plane of the acid settler) should be so designed so that in at an operating throughput of emulsion the vertical velocity of the hydrocarbon phase leaving the horizontal emulsion conduit and entering the upper liquid outlet means is less than about 2 feet per minute and preferably less than about 1.5 feet per minute up flow of hydrocarbon measured near the horizontal emulsion conduit. At these reasonably low superficial velocities entrainment of acid in the liquid hydrocarbon phase is substantially reduced. It is deemed to be within the art to use the above criteria to design a vessel which will limit the maximum vertical velocities knowing a certain emulsion input rate passing into the settling vessel.

The overall height in a vertical direction of the acid settler vessel should be of sufficient dimension to allow the interface between the upper liquid hydrocarbon phase and the lower acid phase to be at a sufficient distance from the upper outlet means so that should a plane upset occur or intermittent high up flow hydrocarbon velocities occur that entrainment of acid in the hydrocarbon phase removed from the acid settler will be substantially reduced.

The horizontal emulsion conduit utilized in this specification and the attached claims shall refer a piece of apparatus which is essentially wholly contained within the acid settler vessel. The horizontal emulsion conduit preferably is elongated and is positioned totally within the settling vessel so that it is horizontally located in that vessel. The horizontal emulsion conduit comprises two concentric tubes which are also elongated and which are placed in a horizontal manner and provide an annular spacing between the inside of the outer tube and the outside of the inner tube. Each tube contains one or more openings or slots which are longitudinally arranged along the length of each tube. Preferably each tube contains two sets of openings or slots longitudinally arranged on the respective tubes. The two sets of openings on the inner tubes and two sets of openings on the outer tubes are preferably positioned so that on the inner tube the openings are placed at the top and bottom portions vertically opposite one another and on the outer tube the openings are horizontally opposed. In this manner an emulsion which passes into the inner tube passes out of that tube in an upward and downward direction through the openings so provided, contacts the inner wall of the outer tube and eventually leaves the outer tube via the horizontally opposed openings. This preferred arrangement of the openings on the inner and outer tubes allows a finite pressure drop along the entire inner tube so that fluid distribution may take place equally along its length. At various positions along the horizontal emulsion conduit there are substantially equal flow rates of emulsion leaving the emulsion conduit and passing into the inner volume of a settler vessel. This allows the overall operations within this vessel to be reasonably controllable. The horizontally opposed openings on the outer tube allow emulsion which enters the settling vessel to flow in a horizontal direction minimizing the chances of high vertical liquid velocities should plant upsets occur and minimize disturbances to the interface between hydrocarbon and acid phases.

The horizontal emulsion conduit also contains one plate located at the end of the inner and outer tubes which blocks off the annular portion together with the inner tube and the outer tube portion from the inside of the settling vessel. This plate prevents the passing of emulsion out of the inner tube from one of its ends and causes the emulsion passing into the inner tube to leave the inner tube by the openings provided on that tube. At the other end of the horizontal emulsion conduit there is a plate which seals off the outer tube and the annular space provided between the inner and outer tube from the inside of the vessel. Also located at this end of the inner tube is an emulsion inlet means which is typically a pipe which receives emulsion from an outside source passing it through the settling vessel. The emulsion inlet means is in direct communications with the inner tube within the horizontal emulsion conduit.

By utilizing the above described arrangement of the horizontal emulsion conduit an emulsion passes through a conduit into the inner tube of the horizontal emulsion conduit, passes preferably out of the upper and lower openings located on the inner tube and into the annular volume located between the outer and inner tubes. The emulsion then contacts the inside wall of the outer tube and is directed out of the openings located on the outer tube, preferably in a horizontal arrangement. As can be seen the preferred placement of two vertical openings on the inner tube and two horizontal openings on the outer tube allows the emulsion which eventually leaves the horizontal emulsion conduit to be flowing essentially in a horizontal direction which is preferred. This horizontal flow prevents undue disturbance of the interface or of the two liquid phases within the settling vessel. Should the flow of the emulsion from the emulsion conduit be in a vertical direction it would be possible that at some location within the vessel the vertical or downward velocity of the emulsion would be greater than that desired and would enhance the carry over of acid into the hydrocarbon phase withdrawn from the upper portion of the acid settler or the carry over of excess quantities of hydrocarbons into the lower liquid outlet means from the vessel.

It is preferred that the placement of the horizontal emulsion conduit within the settling vessel be at a point below the horizontal plane which runs through the center of the settling vessel. A reason for preferring the horizontal emulsion conduit to be in the lower half of the acid settler is that in typical HF alkylation processes a larger quantity of hydrocarbon in the acid can be tolerated than acid in the hydrocarbon. It is also desired to minimize the entire acid inventory. When the horizontal emulsion conduit is located in the lower half of the settling vessel and the interface between the upper hydrocarbon phase and the lower acid phase is somewhere near the horizontal emulsion conduit a lower inventory of acid would be present than if the horizontal emulsion conduit was located in the upper half of the settling vessel. It is especially preferred to maintain the horizontal emulsion conduit at a distance sufficiently close to the bottom walls of the acid settling vessel so that in HF alkylation processes less than 1 percent acid is entrained in the hydrocarbon leaving the upper portion of the acid settler and less than about 15 percent hydrocarbons are present and the acid leaving the bottom portion of the acid settler. It is also preferred to place the horizontal conduit within the acid settling vessel so that the surface area of the horizontal plane intersecting the vessel and the emulsion conduit is such that his surface area measurement is within at least 70 percent of the value of the horizontal surface area of the acid settler when measured at its vertical midsection. This is to reduce construction costs by utilizing the largest cross-sectional area available within the vessel as the location where the horizontal emulsion conduit is located and also to provide for a maximum vertical travel of hydrocarbons from the emulsion conduit to the hydrocarbon outlet on the settling vessel. In one instance it is preferable to locate the emulsion conduit below the center of the settling vessel but still within an area where the horizontal cross-sectional area of the settling vessel where the emulsion conduit is located is within 70 percent of the maximum horizontal cross-sectional area of the vessel.

It is preferred that the inner and outer tubes which make up the horizontal emulsion conduit be elongated cylinders although in some instance these tubes may be oval or hexagonal or triangular in shape. The preferred construction of these inner and outer tubes is that they be cylindrical.

The preferred location of the openings on the inner and outer tubes is such that the openings located on the inner tube should be placed vertically opposite one another at the top and bottom of the inner tube. The openings on the outer tube should be horizontally opposed. The slots on the outer pipe are designed to provide a low enough velocity of emulsion leaving the outer tube so as to not disturbe the hydrocarbon-acid interface. The slots should preferably be designed to allow an emulsion flow out of them at a velocity of from about 0.3 to about 0.5 feet per second. Lower velocities may occur.

The annular space between the inner and outer tubes should be sufficiently large to allow flow of emulsion from the inner tube and through the openings on the outer tube.

The openings on both the inner and outer tubes can be slots or drilled holes or any other type of opening which can reasonably be fabricated. It is preferred that the openings on the inner tube be round holes and the openings on the outer tube be elongated slots.

In a preferred embodiment the inner tube has drilled holes on the top and bottom portions of that tube. Slots are located, horizontally opposed, on the outer tube.

In another embodiment the inner tube may have slots longitudinally arranged vertically opposite each other. To cause equal flow of emulsion out of the slots along the length of the slots, they may be tapered so the cross-sectional area of each slot can increase in the direction of emulsion flow within the tube to compensate for pressure drop within the inner tube. The inner tube may be constructed so that its inside cross-sectional area, and therefore its inside volume, decreases along its longitudinal axis in the direction of fluid flow within that tube. Similar designs may be utilized in constructing the outer tube. Alternate configurations known to those of ordinary skill in the art may be utilized for both tubes.

The width of the slots which run longitudinally along either or both of the inner and outer tubes should be so designed that emulsion flowing out of the inner tubes and the slots located there on can contact the inner wall of the outer tube and there after pass out of the slot or slots located on the outer tube. It is specifically preferred that the slots on the inner tube and the outer tube not overlap so that emulsion leaving the inner tube passing into the inner volume of the settling vessel would not contact the inner wall of the outer tube.

The materials construction of the apparatus of my invention can be any material which will be able to withstand the temperature and pressures of the operating conditions imposed upon the apparatus and which can reasonably withstand the corrosion present in alkylation systems. The apparatus should also be able to operate reasonably well when used in liquid extraction processes or in any other processing which an emulsion either at high temperature or pressure or both is passed into a settling vessel to be separated into two liquid phases.

The acid settler may in some instances contain horizontal and/or vertical baffles to prevent entrainment of acid in excess quantities in the hydrocarbon phase.

In a preferred embodiment of my invention an acid settling vessel having an overall tangent length of approximately 24 feet with an inside diameter of about 14 feet is utilized. The upper and lower fluid outlet means comprise two outlet pipes each passing into the upper and lower portion of the settling vessel about 6 feet from each end. The upper and lower fluid distribution means comprise 6 feet long 10 inch schedule 40 pipe cut in half and placed over the four liquid outlet means as shown in the drawings to allow for each liquid outlet means to have two openings to the inside of the vessel.

The horizontal emulsion conduit was approximately 24 feet in length with the center of the inner tube being approximately 4 feet 6 inches from the inside bottom surface of the settling vessel. The inner tube comprises an 18 inch pipe which had holes drilled vertically opposed and longitudinally arranged along the length of the pipe to provide a total area of approximately 120 square inches. The outside tube or outer tube was essentially a 30 inch pipe approximately 24 feet in length which had horizontally opposed slots measuring approximately 1 foot wide by 23 feet long. One end of the outer tube of the horizontal emulsion conduit was blocked off. The other end of the horizontal emulsion conduit was blocked off except that an emulsion input means was connected directly to the inner tube and a plate was welded to that end to provide support for that end of the horizontal emulsion conduit.

Using the above approximate dimensions a settling apparatus substantially as described above could accommodate sufficient emulsion which could be separated into an acid phase withdrawn from the settler at a rate of about 1,783,390 pounds per hour with the hydrocarbon removed from the upper portion of the settler in a quantity of about 749,656 pounds per hour at a pressure of about 195 p.s.i.g. and a temperature of about 105°F.

I claim as my invention:

1. A settler apparatus for separating an emulsion into two liquid phases which apparatus comprises:
    a. an elongated settling vessel horizontally positioned along a longitudinal axis of said vessel;
    b. an elongated emulsion conduit horizontally positioned within said vessel, said emulsion conduit comprising elongated horizontally disposed inner and outer tubes axially aligned to form an annular volume between the outside of the inner tube and the inside of the outer tube; said inner tube having at least two sets of openings longitudinally arranged on said tube, one of said sets of openings located on the top and the other set of openings located on the bottom of said inner tube; said outer tube having at least two slots longitudinally arranged on said tube and positioned horizontally opposed to each other;
    c. upper and lower liquid outlet means connected to said vessel to allow removal of liquid from a top portion and a bottom portion of said vessel;
    d. emulsion inlet means connected to said inner tube to allow passage of emulsion into said inner tube; whereby emulsion can pass into said inner tube, through the sets of openings located thereon into said annular volume, through the slots located on said outer tube and into said vessel to be separated into two phases and removed from said vessel by said upper and lower outlet means.

2. Claim 1 wherein said emulsion conduit is placed in said settler vessel at a location below a vertical center of said vessel.

3. Claim 1 wherein said inner and outer tubes have two ends, one of said ends of both tubes sealed off from the inside of said settling vessel.

4. Claim 3 in that the other end of said inner tube is connected to said emulsion inlet means and the other end of said outer tube is sealed off from the inside of said settling vessel.

5. Claim 1 in that said openings on said inner tube are circular holes.

6. Claim 1 in that said openings on said outer tube are elongated slots.

7. A settler apparatus for separating an emulsion into two liquid phases which apparatus comprises:
    a. an elongated settling vessel horizontally positioned along a longitudinal axis of said vessel;
    b. an elongated emulsion conduit horizontally positioned within said vessel, said emulsion conduit comprising elongated horizontally disposed inner and outer tubes having two ends and axially aligned to form an annular volume between the outside of the inner tube and the inside of the outer tube; one end of said inner and both ends of said outer tubes sealed off from the inside of said settling vessel; said inner tube having two sets of openings longitudinally arranged on said tube one set of openings located on the top and the other set of openings located on the bottom of said inner tube; said outer tube having two slots longitudinally arranged on said tube and positioned horizontally opposed to each other;
    c. upper and lower outlet means connected to said vessel to allow removal of liquid from top and bottom portions of said settling vessel; and,
    d. emulsion inlet means connnected to the other end of said inner tube to allow passage of emulsion into said inner tube; whereby emulsion can pass into said inner tube, through the openings located thereon into said annular volume; through the two slots located on the outer tube and into said vessel to be separated into two phases and removed from said vessel by said upper and lower outlet means.

8. Claim 7 in that said openings on said inner tube are circular holes.

9. Claim 7 in that said openings on said outer tube are elongated slots.

* * * * *